Patented Jan. 11, 1949

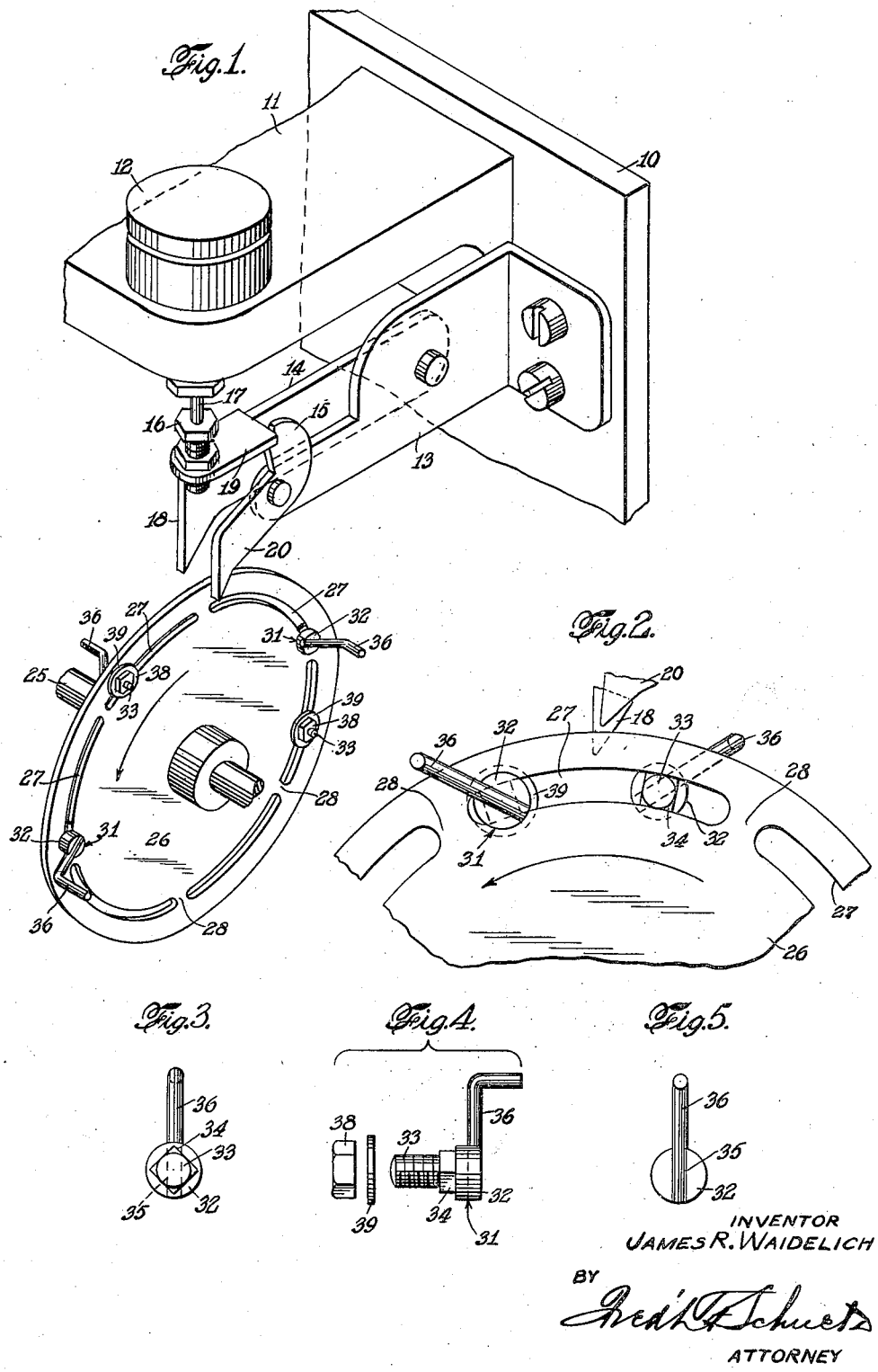

2,458,752

UNITED STATES PATENT OFFICE 2,458,752

TAPPET-ACTUATING MEMBER

James R. Waidelich, Naugatuck, Conn., assignor to The Bristol Company, Waterbury, Conn., a corporation of Connecticut Application April 18, 1946, Serial No. 663,083

4 Claims. (Cl. 74—568)

This invention relates to cam members such as may be utilized in process time cycle controllers, and more especially to means for operating a valve or switch, or equivalent control element in a cycle controller of the cam-actuated type wherein it is required that said valve or switch or equivalent be abruptly set in either of two significant positions at any preselected instant in the time-range of the controller. The art in process cycle controllers of the class in which the present invention lies is well exemplified in the co-pending application Serial No. 375,097 for improvements in Process cycle controllers, filed January 21, 1941 by Harold E. Allen, and assigned to the assignee of applicant for patent on the present invention. Said application has issued as Patent No. 2,442,835.

The control instrument set forth and claimed in said H. E. Allen application includes a plurality of pilot valves adapted for abrupt opening or closing at preselected instants in a cycle of operation by means of corresponding cam members carried on a common shaft, together with means for advancing said shaft in such a manner that as the time cycle progresses said valves will be operatively engaged or disengaged by suitable conformed portions of the peripheries of said cam members. As shown in said application, each of the cam members is formed with peripheral portions having either of two definite radius values, and as the valve actuating element is engaged thereby it will assume an open or closed position according to which of said portions participates in said engagement.

An important attribute of process cycle controllers lies in flexibility of timing adjustment, and the ease and expediency with which adjustment may be effected. In the instrument set forth in said Allen application, the cams are characterized by having their peripheral profiles definitely formed before assembly; and, while by the use of a laminated construction, there may be made possible a certain degree of flexibility in adjustment, complete adjustability requires a variety of types and forms of cam elements, involving a considerable number of "spares," some of which will at all times be idle, together with the assembly problem attendant upon removing certain elements and replacing them by others.

It is an object of the present invention to provide a combination of a quick-acting control with an actuating cam member capable of infinite adjustment, with a minimum number of parts, and without the need for "spares."

It is a further object to provide a cam member of this nature in which means for determining the "opening" and the "closing" events in the controlled cycle may be independently and non-interferingly set each at any desired point on the periphery.

It is a further object to provide a cam member of the aforesaid nature in which any desired number of alternate "opening" and "closing" events may be adjustably and non-interferingly grouped upon a single cam.

It is a further object to provide an adjustable cam member of the aforesaid nature which shall be at once rugged in construction, inexpensive to manufacture, and not subject to accidental displacement of active parts, with consequent shifting of the time setting, or interference with the pre-established cycle.

In carrying out the purposes of the invention, it is proposed to provide in combination with valve or equivalent control means adapted to actuation by means of a tappet of the latching type, cam means comprising, in the specific embodiment herein described by way of example, a rotatable discoid element carrying on its peripheral portion adjustably positioned identical dog members, each having an axial projection so disposed that the action of each of said dog members with respect to either opening or closing said control means depends solely upon the axial sense in which said projection is extended. It is further proposed so to conform and dispose each of said dog members with respect to the discoid element by which it is carried that it may be set to become operative at any point through the whole circumference thereof, thus rendering the time setting of each event controlled thereby subject to infinitely precise adjustment.

The nature of the invention, however, will best be understood when described in connection with the accompanying drawings, in which:

Fig. 1 is a perspective view of a portion of a time cycle controller incorporating the principles of the invention.

Fig. 2 is a fragmentary end elevation of a portion of a cam member constructed according to the principles of the invention, and is shown on an enlarged scale.

Fig. 3 is a rear elevation, Fig. 4 an exploded view and Fig. 5 a front elevation of a portion of the mechanism forming said cam member.

Referring now to Fig. 1 of the drawings, 10 designates a base plate carrying a bracket member 11 upon which is suitably mounted a control valve 12, which may expediently be of the type fully set forth and disclosed in U. S. Letters Patent No. 1,890,494, granted to P. A. Borden December 12, 1932, and including a stem having two extreme positions, and adapted to actuation to either of said positions by means of a tappet element presently to be described. Alternatively to the valve 12 there may be mounted a control element in the form of an electric switch (not shown); for example of the type exemplified in U. S. Letters Patent No. 1,960,020, granted to P. K. McGall, May 22, 1934. In fact, said valve may be replaced by any form of control device adapted to actuation to either of two significant positions by means of limited excursion of a juxtaposed tappet member.

Secured to the base-plate 10 is a further bracket member 13, extending forwardly from said base-plate, and adapted to provide bearings for a tappet arm 14 and a latch member 15. The tappet arm 14 carrying a vertically adjustable tappet screw 16, is journalled to said bracket member 13 at a point near the base-plate 10 and is adapted for limited angular displacement about an axis, whereby said screw will engage the stem 17 of the valve 12, and with displacement of said tappet arm, will actuate said valve in a generally vertical sense in accordance with the displaced position of said arm. A downwardly extending portion of said tappet arm is formed into a cam follower part 18, having an inclined surface adapted to operative engagement by actuating means hereinafter to be set forth. A horizontally extending portion of said tappet arm is formed into a rest or stop 19 adapted for engagement by the latch member 15 journalled toward the outward extremity of the bracket 13, to be supported thereby in its uppermost operating position. The latch member 15 is provided with a downwardly extending portion 20 conformed to function as a trigger or cam follower, similar to the cam follower 18 and similarly adapted for operative engagement. The relation between the tappet arm 14 and the latch 15 is made such that when the former has been lifted to its uppermost setting, as shown in Fig. 1 of the drawings, the latch 15, impelled by gravity (or, if desired, by spring means not shown in the drawing), will assume a position to support the rest 19, and thereby the whole of the tappet arm 14, in said setting. Under this condition, the cam follower portion 18 of the tappet arm 14 will rest materially higher in elevation than the corresponding part 20 of the latch member 15. Upon the cam follower 20 being lifted to its uppermost position, the rest 19 will be released, allowing the tappet arm 14 to fall to its lowest setting, actuating the valve 12 in a sense opposite to that corresponding to its former condition. While, with the tappet arm 14 depressed, the position of the latch 15 becomes of no significance, the juxtaposed faces of the stop 19 and the latch may expediently be so formed that the latter will at that time be retained in its highest position. Thus, engagement of the cam follower 18 by suitable means will cause the valve 12 to be actuated in one sense (i. e. opened), and to remain so, until actuation of the cam follower 20 by other and similar means will cause said valve to be actuated in the opposite sense (i. e. closed).

The cam mechanism for actuating the control element 12 through the agency of the tappet arm 14 and the latch 15, and to which the present invention is specifically directed, will now be described. A shaft 25, supported and journalled in bearing members designed to be secured to the base-plate 10, but not shown in the drawing, is adapted to be rotated about its axis, either continuously or intermittently, according to the nature of the process cycle to be controlled, by suitable motor means, forming no part of the present invention and not shown in the drawing, but of a nature fully set forth and described in said Allen application, Serial No. 375,097. Secured to the shaft 25 to be rotated thereby in a direction as indicated by the arrow is a circular disk or plate 26, formed of flat material, and having near its periphery a discontinuous circumferential slot or, rather, a series of slots 27 of uniform width and concentric with said shaft. The slots are interrupted by a number of bridge pieces or "spokes" 28, whereby is provided supporting means for the unbroken rim of said disk.

In Figs. 3 to 5 inclusive is shown in detail a dog or actuating element, whereby the previously described tappet arm and latching mechanism are rendered responsive to rotation of the disk 26. For example, a stud member 31 is provided at one extremity with an enlarged head portion 32, and at the other extremity with a threaded portion 33. Intermediate said head and threaded portions is a squared portion 34 of axial extent slightly less than the thickness of the material of the disk 26, and of a distance across its flat faces such as to provide a sliding fit in a slot 27 in said disk. Formed in the head portion 32 is a groove 35, disposed parallel to the diagonal of the squared portion 34, and in which is carried in being secured therein as by soldering, brazing, or welding, an L-shaped finger part 36, to extend radially from said head portion 32 and to project from its extremity in a sense parallel to the longitudinal axis of said stud, as clearly indicated in Fig. 4 of the drawings. The proportions of said finger part 36 are so selected with respect to those of the disk 26 that, when the stud 31 is placed with its squared portion 34 in a slot 27 of said disk and at an extremity of one of the sections of said slot, in contact with one of the spokes 28, the radial portion of the finger part 36, projecting at an angle of 45 degrees with the radius of the disk will extend beyond the center line of said spoke, with the axially extended portion thereof disposed from the axis of the shaft 25 a distance slightly greater than the radius of the disk. Thus according to the axial direction in which the finger part 36 is projected, the path followed thereby will be intersected by one or other of the cam-follower portions 18 and 20, when a said cam-follower is at its lowest position.

It will be observed that the stud 31 may be placed in a slot 27 in any one of four operative positions, viz., with the axially extended portion of the finger part 36 projecting toward the right or toward the left, whereby to actuate respectively either the tappet arm 14 or the latch 15, and sloped either forward or backward with respect to the radius of the disk 26, whereby the circumferential displacement of the angularly disposed finger part 36 may be utilized to span any one of the spokes 28 to which it may happen to be juxtaposed, whereby the actuating elements may be adjustably positioned at any desired location through the whole circumferential range about the disk member 26. A nut 38 and an associated washer 39 adapted to cooperate with the threaded portion 33 of the stud 31 provide for clamping the same at any desired setting about the periphery of the disk; and it will be apparent that, while in Fig. 1 four actuating dogs are shown assembled

I claim:

1. A cam member for actuating tappet mechanism, comprising a rotatable supporting element having an edge portion separated from the remainder of the element by a series of arcuate slots therethrough circumferentially disposed adjacently to one another and evenly spaced in the cam member, with bridge portions separating said slots; and a stud element having a squared section adapted to fit a slot and to be secured to the supporting element to prevent rotation of said stud element in its slot, the head of the stud element being provided with a groove disposed diagonally to the squared section, and an L-shaped finger element secured through its one portion in the said groove to extend outwardly from the said head beyond the edge portion of the rotatable supporting element with its other portion projecting in a sense parallel to the longitudinal axis of the stud element.

2. The cam member claimed in claim 1, wherein the supporting element is a rotatable, discoid member, and the L-shaped finger element extends beyond the circumference of the supporting element with its said other portion projecting parallel to the axis of rotation of the said supporting element.

3. A cam member for actuating tappet mechanism, comprising a rotatable discoid plate having in its peripheral portion a series of arcuate slots of uniform width separated from one another by bridge parts, and a stud member adapted to be positioned in any one of said slots and means to secure the same therein at any desired circumferential location, said stud member having a part integral therewith extended radially from its axis and carrying an engaging element, and said stud member having also a portion of square section with its diagonal substantially parallel to said extended part and sides of width corresponding to that of said slots, whereby the stud may be secured therein to limit the angular disposition of said stud about its axis for extension beyond the circumference of the discoid plate to either of two mutually perpendicular settings—in one of which settings said extended part, with respect to the direction of rotation of said plate, will extend forwardly of the axis of the stud and in the other rearwardly thereof.

4. A cam member for actuating a mechanism having an engaging portion operatively displaceable in a plane, comprising a discoid plate juxtaposed to said mechanism and rotatable about its axis in a sense substantially parallel to said plane, and having in its peripheral portion a series of arcuate slots of uniform width separated from one another by bridge parts and forming elements in a circle of radius insufficient to intersect said engaging portion, a stud member adapted to be positioned in any one of said slots and means to secure the same therein at any desired circumferential location, said stud member having a part integral therewith extended radially from its axis and carrying an element adapted for cooperation with said engaging portion of said mechanism to actuate the same when said stud is secured in said slot with said extended part positioned to describe a circle of radius sufficient to intersect said engaging portion, said stud member having also a portion of square section with its diagonal substantially parallel to said extended part and sides of width corresponding to that of said slots, whereby when secured therein to limit the angular disposition of said stud about its axis to either of two mutually perpendicular settings wherein said extended part may describe said last-named circle, and in one of which positions said part, with rotation of said plate, will "lead" and in the other of which "lag," the radius passing through the point on said first-named circle at which said stud is secured, the circumferential span of said extended part due to its angularity with said radius being at least half the width of one of said bridge parts, whereby to render said cooperating element carried thereby positionable to any location about the periphery of said plate.

JAMES R. WAIDELICH.

REFERENCES CITED

The following references are of record in the file of this patent:

UNITED STATES PATENTS

| Number | Name | Date |
| --- | --- | --- |
| 942,843 | Potter et al. | Dec. 7, 1909 |
| 1,492,492 | Talbot | Apr. 29, 1924 |
| 1,890,494 | Borden | Dec. 12, 1932 |
| 1,960,020 | McGall | May 22, 1934 |
| 2,100,876 | Schneider | Nov. 30, 1937 |